Figure 1:
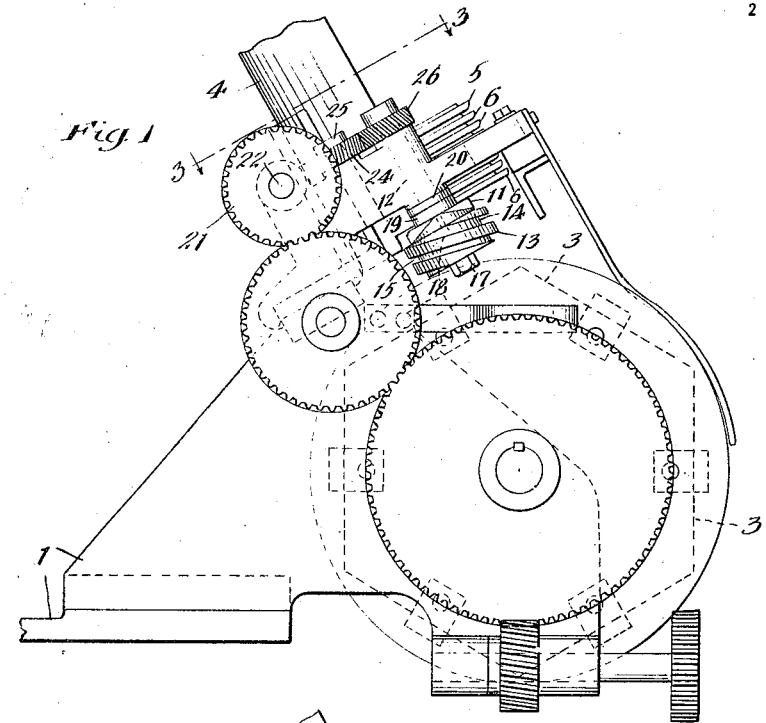

J. W. DIXON.
AUTOMATIC FEEDING DEVICE FOR CAN HEADS OR OTHER DISKS.
APPLICATION FILED NOV. 3, 1910. RENEWED APR. 29, 1915.

1,161,931.

Patented Nov. 30, 1915.
2 SHEETS—SHEET 1.

Witnesses:
Wm. Geiger
Pearl Abrams

Inventor:
James W Dixon
By Munday, Evarts, Adcock & Clarke
his Attys

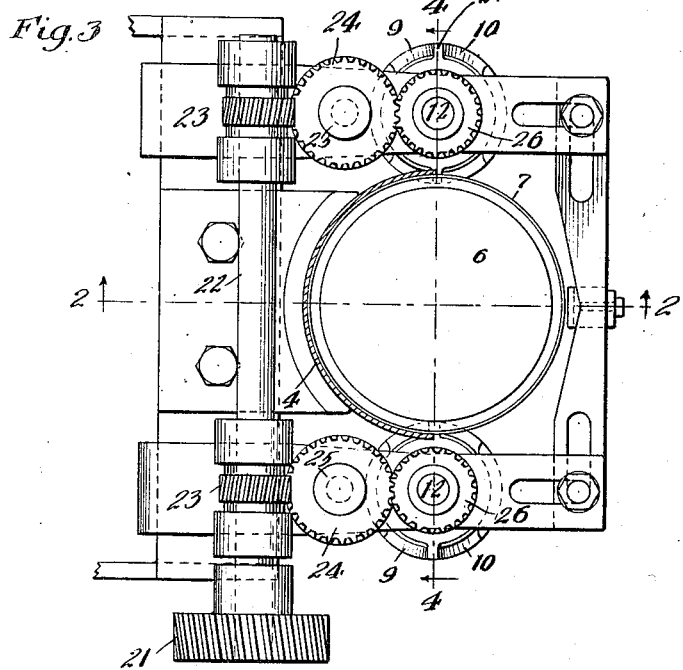
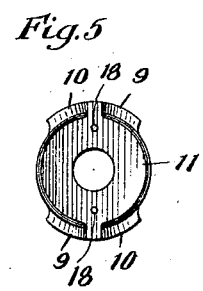
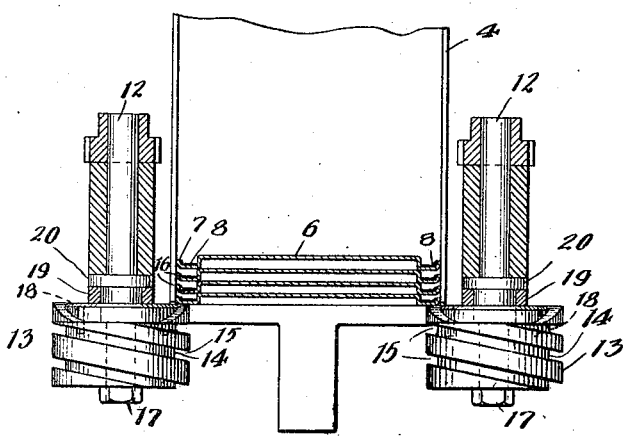

UNITED STATES PATENT OFFICE.

JAMES W. DIXON, OF CHICAGO, ILLINOIS, ASSIGNOR TO AMERICAN CAN COMPANY, OF NEW YORK, N. Y., A CORPORATION OF NEW JERSEY.

AUTOMATIC FEEDING DEVICE FOR CAN-HEADS OR OTHER DISKS.

1,161,931.  Specification of Letters Patent.  Patented Nov. 30, 1915.

Application filed November 3, 1910, Serial No. 590,448. Renewed April 29, 1915. Serial No. 24,804.

*To all whom it may concern:*

Be it known that I, JAMES W. DIXON, a citizen of the United States, residing at Austin, Chicago, in the county of Cook and State of Illinois, have invented a new and useful Improvement in Automatic Feeding Devices for Can-Heads or other Disks, of which the following is a specification.

My invention relates to improvements in feeders for can heads or other disks, and more particularly to feeders which operate to feed the can heads or other disks one by one from a stack or pile.

Heretofore, great difficulty has been experienced in practical operation of rotary can head feeders of the kind to which my invention relates, which have segmental feeder blades or teeth spaced apart the thickness of the can head and alternately arranged so that the stack or pile of can heads is supported, first on one blade and then on the other, the lower blade supporting the pile of can heads until the upper blade enters between the lowermost can head and the adjacent one above it, and the upper blade supporting the pile of can heads while the lowermost head is discharged by the lower blade in properly feeding the can heads, the flanges of which have been coated with the customary rubber cement, or other more or less sticky or adhesive packing composition, owing to the tendency of the cement to cause the lowermost head, after it has been discharged by the feeder, to adhere to the one above it until the latter is also discharged, thereby causing the feed of two heads at once, and consequent clogging or interrupting operation of the can closing or seaming machine to which the heads are delivered.

The object of my invention is to provide an improved construction of can head feeder, which will obviate the difficulties heretofore experienced, and cause each head, as it is fed, to be positively separated a sufficient distance from the one above it to prevent all possibility of the cement packing, however much it may be stretched from one head to another, from causing two or more heads to adhere together.

It further consists in connection with a can head holder, and a rotary feeder, of means for imparting to each head as it is released by the feeder, a rotating or turning movement in respect to those above it, to insure the breaking of any cement connection between adjacent heads.

It further consists, in connection with a can head holder and a rotary can head feeder, of a worm below the feeder adapted to engage the heads as they are released by the feeder and to further space them apart.

It further consists in the novel construction of parts and devices and in the novel combinations of parts and devices herein shown and described, and more particularly specified in the claims.

Figure 2:
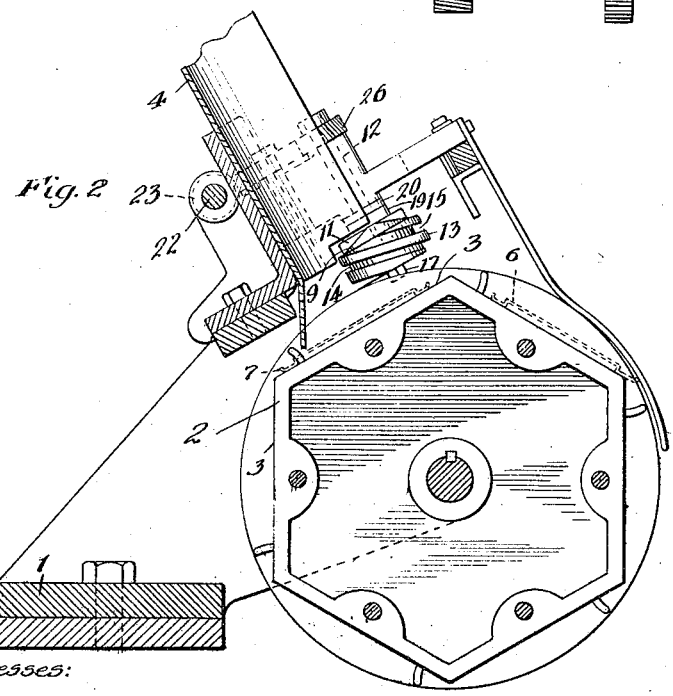

In the accompanying drawing forming a part of this specification, Figure 1 is a side elevation of a can head feed device embodying my invention. Fig. 2 is a cross section on line 2—2 of Fig. 3. Fig. 3 is a detail section on line 3—3 of Fig. 1. Fig. 4 is a vertical cross section on line 4—4 of Fig. 3, and Fig. 5 is a detail plan view of one of the feeders.

In the drawing, 1 represents the frame of the machine, the same being preferably a bracket or arm suitable for attachment to the frame of the double seaming machine to which the can heads are to be fed. In the instance illustrated in the drawing, the seaming machine to which the can heads are to be fed has an intermediate delivery wheel 2, furnished with polygonal faces or seats 3, to which the can heads are to be delivered one by one as the delivery wheel 2 rotates.

In the drawing, 4 represents a can head feeder in which a stack or pile 5 of can heads 6 is placed, one resting flat on top of another. The can heads 6 have seaming flanges 7, the channel or groove of which is filled with rubber cement or other adhesive packing 8 to enable the can heads to be hermetically secured to the can bodies by a double seam.

The can head holder is preferably arranged in a somewhat inclined position and the pile or stack of can heads therein alternately rests upon and is supported by the segmental feeders 11, two of which are preferably employed and arranged at diametrically opposite points of the can head pile. Each of these rotary can head feeders 11, preferably has segmental feeder blades alternately arranged, each segmental feeder blade being formed with two faces 9 and 10 inclined upwardly and connected by a short, flat supporting face 27. As viewed in Fig. 3, these rotary head feeders 11 rotate clockwise, and the rear inclined face 10 has its lower edge resting or merging with a flat portion 28 of the screw thread 13. The upper face of these threads 13 clears the advancing edge of the supporting face 9.

In operation, the stack of can heads is supported first on the faces 27 and is gradually lowered until the stack rests on the supporting faces 28 of the threads 13. Upon a continued rotation of the rotary head feeder 11, the lowermost can head slides down upon the upper face of the thread 13 and the remainder of the stack or pile of can heads is cut out by the edge of the face 9 and the entire stack rises until it is again supported on the face 27. The rotary feeders 11 are preferably continuously driven, and as shown, two can heads are discharged at each complete rotation of the feeder.

To cause the discharged or released can heads to be positively forced apart or separated from each other a sufficient distance to positively sever any adhesive connection between adjacent heads, and thus prevent one head clinging to another after the same have been released by the feeder, I provide the shaft 12 of each of the feeders with a can head separator 13, preferably in the form of a worm, the threads 14 of which are preferably spaced apart several times the thickness of the can heads, preferably about three times the thickness of the can heads, thus causing the released can heads to be bodily separated from each other a considerable distance. And to further insure rupture of all adhesive threads or connections which the rubber cement or other packing composition may form between adjacent heads, I preferably provide each of the separators 13 with means 15 for causing the rotation of the released can heads in respect to the pile or stack from which they have been discharged. The means 15 on the separators 13 for so causing the released can heads to rotate in respect to the pile, preferably consists in separator grooves for the can heads between the threads 14 of the worm 13, so placed as to have a slight frictional gripping action against the curled edges 16 of the seam flanges 7 of the can heads.

The can head separator worm 13 is secured on the shaft 12 of the feeder 11 by means of a nut 17, and it is caused to rotate with the feeder while adapted to have a sliding or yielding movement in respect thereto, by means of dowel pins 18 on the one member and holes in the other. A rubber or other cushion 19 is interposed between the feeder 13 and the collar or shoulder 20 on the shaft 12 of the separator, thus allowing the feeder and separator to slightly yield or slide apart in respect to each other, as may be necessary to accommodate variable thickness of the can heads.

The can head feeders 11 are preferably continuously rotated from a gear 21, driven from the seaming or other machine with which the feeder is connected, said gear being on a shaft 22, having worms 23, engaging worm gears 24 on shafts 25, which gears 24 mesh with gears 26 on the shafts 12 of the rotary feeders.

As the pile or stack of can heads rests on the supporting faces 9, 10 of the blades of the feeder 11, the rotation of the feeders tends to cause the stack or pile of can heads to slowly creep around or rotate in the holder in practice, but this turning movement of the pile or stack is materially slower than the rotation of the separated can heads in the separators 13, and thus does not interfere with the action of the separators in breaking or forcing apart any connecting threads of rubber cement between adjacent can heads by imparting to the separated can heads a rotary movement.

I claim:—

1. The combination with a holder for a pile or stack of can heads, of a pair of rotary feeders, each having feeder blades alternately arranged and separators for forcing farther apart the released can heads as they are discharged by the feeder, substantially as specified.

2. The combination with a holder for a pile or stack of can heads, of a pair of rotary feeders, each having feeder blades alternately arranged and separators for forcing farther apart the released can heads as they are discharged by the feeder, said separators being also adapted to rotate the released can heads in respect to the can heads in said holders, substantially as specified.

3. The combination with a holder, of a rotary feeder having feeder blades alternately arranged and portions of them spaced apart, of a separator to force farther apart the articles released by the feeder, substantially as specified.

4. The combination with a holder, of a rotary feeder having feeder blades alternately arranged and portions of them spaced apart, of means for rotating the released article as it is discharged by the feeder from the holder, substantially as specified.

5. The combination with a holder for a stack or pile of articles, of a rotary feeder having feeder blades alternately arranged and portions of them spaced apart, and a worm separator rotating with the feeder for forcing farther apart the articles as they are released by the feeder, substantially as specified.

6. The combination with a holder for a stack or pile of articles, of a rotary feeder having feeder blades alternately arranged and portions of them spaced apart, and a worm separator rotating with the feeder for forcing farther apart the articles as they are released by the feeder, said worm separator having spiral threads, the groove portions of which are so disposed as to frictionally grip the peripheral edge of the articles as they are fed or released by the feeder from the holder, substantially as specified.

7. The combination with a can head holder, of a pair of rotary feeders, each having feeder blades alternately arranged and portions of them spaced apart, and a pair of rotary worm separators on the shafts of the feeders, substantially as specified.

8. The combination with a can head holder, of a pair of rotary feeders, each having feeder blades alternately arranged and portions of them spaced apart, and a pair of rotary worm separators on the shafts of the feeders, said worm separators peripherally gripping the released can heads and causing them to rotate in respect to the holder, substantially as specified.

9. The combination with a can head holder, of a pair of rotary feeders, each having feeder blades alternately arranged and portions of them spaced apart, and a pair of rotary worm separators on the shafts of the feeders, said worm separators peripherally gripping the released can heads and causing them to rotate in respect to the holder, said feeders having a yielding connection with said rotary worm separators to accommodate can heads of varying thicknesses, substantially as specified.

10. The combination with a can head holder, of a rotary feeder having segmental feeder blades alternately arranged and portions of them spaced apart, of a rotary worm separator on the shaft of the feeder, the shaft of the feeder having a cushion engaging the feeder to permit it to yield slightly in respect to said rotary worm separator, substantially as specified.

JAMES W. DIXON.

Witnesses:
PEARL ABRAMS,
EDMUND ADCOCK.